W. B. SPEIR.
SPRING SEAT.
APPLICATION FILED APR. 26, 1909.
950,061.
Patented Feb. 22, 1910.
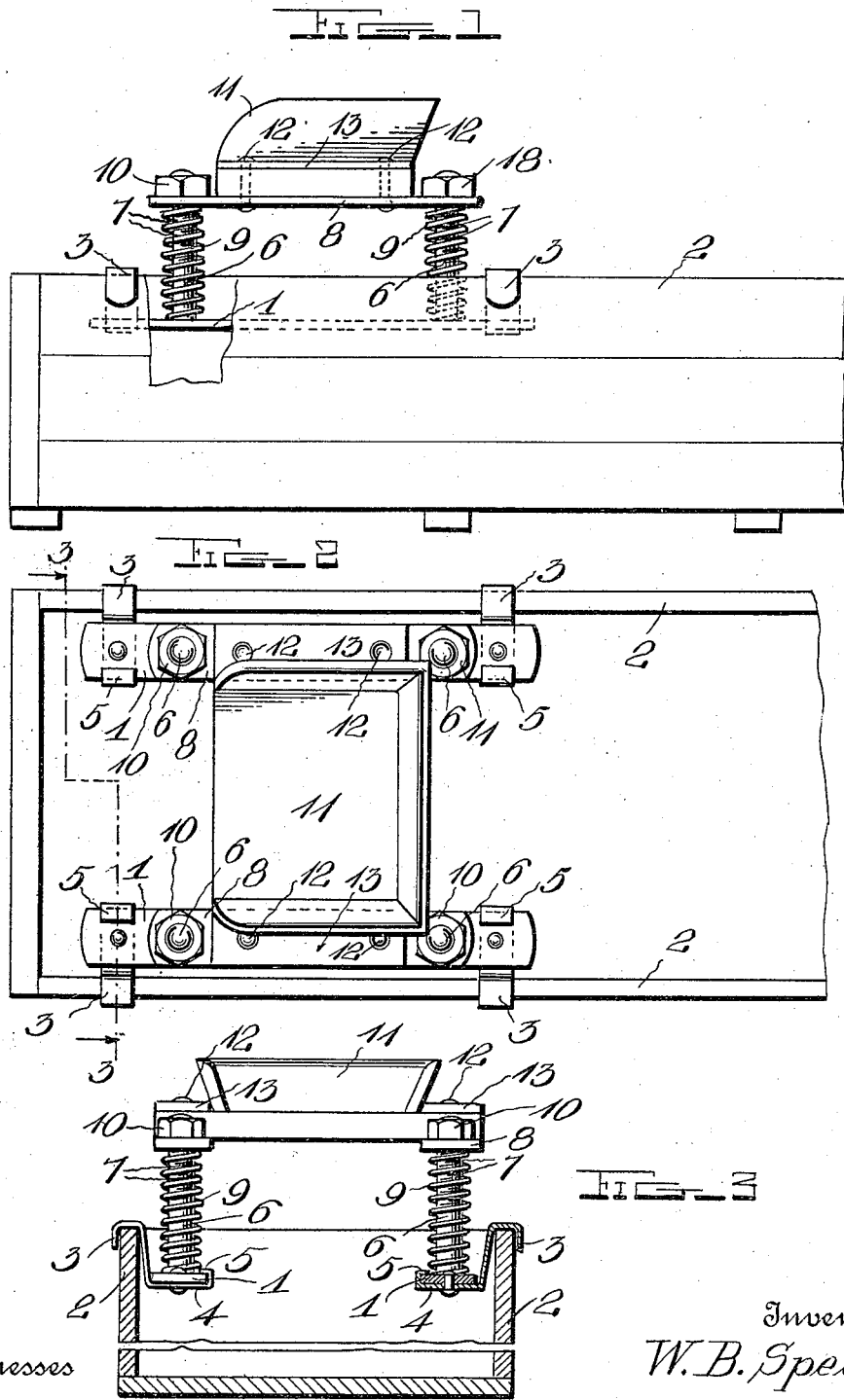
Witnesses
C. H. Griesbauer
Inventor
W. B. Speir
by H. B. Willson & Co.
Attorneys

UNITED STATES PATENT OFFICE.

WILLIAM B. SPEIR, OF ROSALIE, TEXAS, ASSIGNOR OF ONE-HALF TO WILL COE, OF ROSALIE, TEXAS.

SPRING-SEAT.

950,061.        Specification of Letters Patent.      Patented Feb. 22, 1910.

Application filed April 26, 1909. Serial No. 492,355.

*To all whom it may concern:*

Be it known that I, WILLIAM B. SPEIR, a citizen of the United States, residing at Rosalie, in the county of Red River and State of Texas, have invented certain new and useful Improvements in Spring-Seats; and I do declare the following to be a full, clear, and exact description of the invention, such as will enable others skilled in the art to which it appertains to make and use the same.

This invention relates to a spring seat for wagons and has for its object to provide a simple device of this kind which may be readily placed in or removed from position as the occasion may necessitate and which is so constructed as to possess the maximum resiliency so that jars or vibrations induced in the vehicle in passing over rough or irregular roads will be absorbed by the seat and thus insure the easy riding of the driver or other occupant.

With this and other objects in view, the invention consists of certain novel features of construction, combination and arrangement of parts, as will be more fully described and particularly pointed out in the appended claim.

In the accompanying drawings, Figure 1 is a side elevation of my improved seat as applied to a wagon, only a portion of the wagon bed being shown; Fig. 2 is a plan view of Fig. 1; and Fig. 3 is a transverse section taken on the plane indicated by the dotted lines 3—3 of Fig. 2.

In the embodiment illustrated the device comprises a pair of frame bars, 1, which are arranged within and to extend longitudinally of the sides, 2, of the wagon bed. Each of these frame bars is provided at opposite ends with clips or hooks, 3, which hook over the upper edge of the adjacent side piece of the wagon body. The inner ends as 4, of these clips or hooks extend under the bottoms of the frame bars with their inner terminals, 5, bent over the inner side edges thereof. Each frame bar is also provided at opposite ends with upright studs, 6, which are riveted or otherwise secured thereto and are provided at their upper ends with threads, 7.

The seat supporting bars, 8, are mounted for vertical adjustment upon said studs and coil springs, 9, disposed around the latter between the seat supporting bars and frame bar 8 and 1, respectively to absorb the shocks or vibrations induced in the vehicle when passing over rough or irregular roads and thus insures the easy riding of the driver. The seat supporting bars, 8, are secured in position by nuts, 10, which screw upon the upper threaded ends of the studs, 6.

The seat proper indicated by the numeral, 11, has its opposite ends secured to the top faces of the seat supporting bars, 8, by rivets, 12, which pass through the seat supporting bars, the ends of the seat, and reinforcing plates 13, which are arranged upon the top face of the seat.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:—

A vehicle seat of the class described, comprising frame bars, means for connecting the frame bars with the top edges of the vehicle body, a pair of vertical studs having threaded upper ends arranged at opposite ends of each of said frame bars, seat supporting bars mounted for vertical adjustment upon said studs, coil springs around the studs between the frame bars and the seat supporting bars, said springs tending to hold the seat supporting bars in elevated position, a seat having extensions at opposite ends bearing upon the seat supporting bars, reinforcing plates on the ends of the seat, rivets passing through the seat supporting bars, the ends of the seat and said plates to secure the latter in position, and nuts screwing on the upper ends of the studs against the seat supporting bars, said nuts holding the seat supporting bars in position and adapted to adjust them upon the studs to regulate the tension of the coil springs.

In testimony whereof I have hereunto set my hand in presence of two subscribing witnesses.

WILLIAM B. SPEIR.

Witnesses:
N. B. IGO,
J. C. DODD.